United States Patent
Hunter

(10) Patent No.: US 11,361,667 B2
(45) Date of Patent: Jun. 14, 2022

(54) SYSTEMS AND METHODS FOR EXPLOITING ADS-B FREQUENCY OF ARRIVAL FOR FLIGHT SURVEILLANCE, CYBER SECURITY AND METEOROLOGY

(71) Applicant: Nexteon Technologies, Inc., Maple Glen, PA (US)

(72) Inventor: Cornelius George Hunter, Cameron Park, CA (US)

(73) Assignee: NEXTEON TECHNOLOGIES, INC., Maple Glen, PA (US)

(*) Notice: Subject to any disclaimer, the term of this patent is extended or adjusted under 35 U.S.C. 154(b) by 135 days.

(21) Appl. No.: 16/548,175

(22) Filed: Aug. 22, 2019

(65) Prior Publication Data

US 2020/0242951 A1    Jul. 30, 2020

Related U.S. Application Data

(60) Provisional application No. 62/798,175, filed on Jan. 29, 2019.

(51) Int. Cl.
*G08G 5/00* (2006.01)
*G05D 1/10* (2006.01)
(Continued)

(52) U.S. Cl.
CPC ......... *G08G 5/0091* (2013.01); *B64C 39/024* (2013.01); *B64D 45/00* (2013.01);
(Continued)

(58) Field of Classification Search
CPC ... G08G 5/0091; G08G 5/0078; H04W 4/029; B64C 39/024; B64C 2201/12; B64D 45/00; G05D 1/042; G05D 1/104
See application file for complete search history.

(56) References Cited

U.S. PATENT DOCUMENTS

| | | | |
|---|---|---|---|
| 6,085,147 A | 7/2000 | Myers | |
| 6,266,014 B1 * | 7/2001 | Fattouche | H04W 64/00 342/450 |

(Continued)

FOREIGN PATENT DOCUMENTS

| | | |
|---|---|---|
| CA | 2897803 A1 | 8/2014 |
| CN | 107818396 A | 3/2018 |

(Continued)

OTHER PUBLICATIONS

Communication pursuant to Rules 161(1) and 162 EPC issued by the European Patent Office in related European Patent Application No. 19759097.9 dated Mar. 11, 2021, 3 pages.

(Continued)

*Primary Examiner* — Aniss Chad
*Assistant Examiner* — Madison R Hughes
(74) *Attorney, Agent, or Firm* — Gesmer Updegrove LLP

(57) ABSTRACT

A system is disclosed for exploiting a transmitted signal from an aircraft to determine characteristics of any of the aircraft's motion or meteorological conditions in which the aircraft is moving. The system includes a plurality of platforms for detecting Doppler shift information of the transmitted signal at each of the plurality of platforms, and a processing system for determining characteristics of any of the aircraft's motion or meteorological conditions in which the aircraft is moving.

8 Claims, 8 Drawing Sheets

(51) Int. Cl.
  *G05D 1/04* (2006.01)
  *B64C 39/02* (2006.01)
  *B64D 45/00* (2006.01)
  *H04W 4/029* (2018.01)

(52) U.S. Cl.
  CPC ............ *G05D 1/042* (2013.01); *G05D 1/104* (2013.01); *G08G 5/0078* (2013.01); *H04W 4/029* (2018.02); *B64C 2201/12* (2013.01)

(56) References Cited

U.S. PATENT DOCUMENTS

| | | | |
|---|---|---|---|
| 8,918,280 | B1 | 12/2014 | Heinrich |
| 9,558,670 | B1 | 1/2017 | Sheth et al. |
| 9,571,978 | B1* | 2/2017 | Ananth .................... G01S 5/14 |
| 2001/0056316 | A1 | 12/2001 | Johnson et al. |
| 2010/0033379 | A1* | 2/2010 | Lommen ............... G01S 1/0428 342/387 |
| 2013/0080043 | A1 | 3/2013 | Ballin et al. |
| 2015/0035699 | A1* | 2/2015 | Yun ....................... G01S 5/0215 342/357.29 |
| 2016/0180715 | A1 | 6/2016 | Burke et al. |
| 2018/0335309 | A1 | 11/2018 | Pan et al. |
| 2019/0316925 | A1 | 10/2019 | Jang et al. |
| 2020/0027358 | A1 | 1/2020 | Fine |
| 2021/0116558 | A1* | 4/2021 | Chan ........................ G01S 7/40 |

FOREIGN PATENT DOCUMENTS

| | | |
|---|---|---|
| JP | 2006321475 A | 11/2006 |
| JP | 2012174266 A | 9/2012 |
| JP | 2016062449 A | 4/2016 |
| WO | 9917080 A1 | 4/1999 |
| WO | 2011009028 A1 | 1/2011 |

OTHER PUBLICATIONS

International Search Report and Written Opinion of the International Searching Authority dated Dec. 11, 2019, in related International Application No. PCT/US2019/044800, 18 pages.

Schafer et al., Secure Motion Verification using the Doppler Effect, Proceedings of the 9th ACM Conference on Security & Privacy in Wireless and Mobile Networks, pp. 135-145, Darmstadt, Germany, Jul. 18-20, 2016.

Ghose et al., Verifying ADS-B Navigation Information Through Doppler Shift Measurements, IEEE/AIAA 34th Digital Avionics Systems Conference (DASC), Sep. 2015, 11 pages.

Leonardi et al., Air Traffic Security: Aircraft Classification Using ADS-B Message's Phase Pattern, Aerospace, No. 4, v. 51, 2017, 14 pages.

Dolan et al., Aireon Independent Validation of Aircraft Position Via Space-Based ADS-B, 2018 Enhanced Solutions for Aircraft and Vehicle Surveillance (ESAVS) Applications Conference, Oct. 17-19, 2018.

Krozel et al., Remote Detection of Turbulence via ADS-B, AIAA Guidance, Navigation, and Control Conference, AIAA SciTech Forum, Jan. 5-9, 2015, Kissimmee, Florida, 12 pages.

International Search Report and Written Opinion of the International Searching Authority dated Feb. 26, 2020, in related International Application No. PCT/US2019/047680, 23 pages.

Nijsure Yogesh Anil et al., Adaptive Air-to-Ground Secure Communication System Based on ADS-B and Wide-Area Multilateration, IEEE Transactions On Vehicular Technology, IEEE Service Center, Piscataway, NJ, US, vol. 65, No. 5, May 1, 2016, pp. 3150-3165.

Steffes et al., FDOA Determination of ADS-B Transponder Signals, Sensor DAA Fusion: Trends, Solutions, Applications (SDF), 2012 Workshop ON, IEEE, Sep. 4, 2012, pp. 84-87.

U.S. Appl. No. 62/798,175, filed Jan. 29, 2019.

Kopec et al., Retrieving atmospheric turbulence information from regular commercial aircraft using Mode-S and ADS-B, Atmos. Meas. Tech., 9, pp. 2253-2265, May 2016.

Notification Concerning Transmittal of International Preliminary Report on Patentability and International Preliminary Report on Patentability issued by the International Bureau of WIPO in related International Application No. PCT/US2019/044800 dated Feb. 18, 2021, 12 pages.

Annex to Form PCTISA/206 Communication Relating to the Results of the Partial International Search issued by the International Searching Authority, the European Patent Office, in related International Application No. PCT/US2019/044800 dated Oct. 18, 2020, 8 pages.

Annex to Form PCTISA/206 Communication Relating to the Results of the Partial International Search issued by the International Searching Authority, the European Patent Office, in related International Application No. PCT/US2019/047680 dated Jan. 2, 2020, 11 pages.

Non-Final Office Action issued by the United States Patent and Trademark Office in related U.S. Appl. No. 16/529,933 dated Jun. 1, 2021, 14 pages.

International Preliminary Report on Patentability issued by the International Bureau of WIPO in related International Application No. PCT/US2019/047680 dated Jul. 27, 2021, 13 pages.

Annex to Form PCT/ISA/206, Communication Relating to the Results of the Partial International Search, issued by the European Patent Office, as International Searching Authority, in related International Application No. PCT/US2021/049799 dated Dec. 23, 2021, 15 pages.

Zoccarato, MTSAT: Satellite-Based Air Traffic Control System for Japan, Electrical Communication, Alcatel, Brussels, BE, Apr. 1, 1997, pp. 127-132, XP000727632, ISSN: 0013-4252.

First Examination Report issued by the Intellectual Property India in related India Patent Application No. 202117004023 dated Jan. 31, 2022, 7 pages.

Examiner's Report issued by Innovation, Science and Economic Development (Canadian Intellectual Property Office) in related Canadian Patent Application No. 3,108,711 dated Feb. 11, 2022, 6 pages.

Notice on Reasons for Refusal issued by the Japanese Patent Office in related Japanese Patent Application No. 2021-529248 dated Mar. 1, 2022, 4 pages.

International Search Report and Written Opinion of the International Searching Authority (the European Patent Office) issued in related International Application No. PCT/US2021/049799 dated Feb. 28, 2022, 22 pages.

Notice on the First Office Action, along with its English translation, issued by China National Intellectual Property Administration in related Chinese Patent Application No. 201980051811.5 dated Mar. 1, 2022, 30 pages.

* cited by examiner

SYSTEMS AND METHODS FOR EXPLOITING ADS-B FREQUENCY OF ARRIVAL FOR FLIGHT SURVEILLANCE, CYBER SECURITY AND METEOROLOGY

PRIORITY

The present application claims priority to U.S. Provisional Patent Application No. 62/798,175, filed Jan. 29, 2019, the disclosure of which is hereby incorporated by reference in its entirety.

BACKGROUND

The invention generally relates to air traffic monitoring systems, and relates in particular to aircraft flight surveillance systems.

The United States Government has mandated the use of Automatic Dependent Surveillance-Broadcast (ADS-B) by commercial transport aircraft by the year 2020, and is also a candidate system for unmanned aircraft vehicle (UAV) systems and unmanned aircraft systems (UAS), hereafter referred to as drones. The ADS-B system provides a surveillance message that is automatically broadcasted by the aircraft (the broadcast message is known as ADS-B out), in contrast to traditional aircraft transponders, which transmit a surveillance signal only when activated by an externally initiated tracking signal (traditionally transmitted by ground-based tracking radars). The ADS-B system was designed to provide enhanced air traffic surveillance, compared what is available only with traditional ground-based radars. In addition to the automatic broadcast feature, the ADS-B system provides, at a rate of 1 Hz or higher, additional data that include latitude, longitude, ground speed, and vertical speed.

The ADS-B system however, does have its drawbacks. It is potentially vulnerable to cyber-attacks. For example, the ADS-B standard does not support verification of the integrity of the broadcasted navigation messages. In addition to this lack of authentication, ADS-B also lacks encryption, and it is consequently relatively easy to send out false information to spoof aircraft or drone trajectories. Another drawback is the relatively coarse quantization of some of the data types. For instance, the aircraft or drone vertical speed typically is quantized to a 64 feet per second (FPS) resolution.

There remains a need therefore, for improved systems for implementing and using ADS-B system in aircraft and/or drone flight surveillance systems.

SUMMARY

In accordance with an embodiment, the invention provides a system for exploiting a transmitted signal from an aircraft or drone to determine characteristics of any of the aircraft's motion or meteorological conditions in which the aircraft is moving. The system includes a plurality of platforms for detecting Doppler shift information of the transmitted signal at each of the plurality of platforms, and a processing system for determining characteristics of any of the aircraft's motion or meteorological conditions in which the aircraft is moving.

In accordance with another embodiment, the invention provides a system for exploiting a transmitted signal from an aircraft or drone to determine characteristics of any of the aircraft or drone's motion or meteorological conditions in which the aircraft is moving. The system includes a plurality of platforms for detecting information of the transmitted signal at each of the plurality of platforms, and a processing system for determining characteristics of any of the aircraft or drone's motion or meteorological conditions in which the aircraft or drone is moving independent of any global position system information.

In accordance with a further embodiment, the invention provides a method for exploiting a transmitted signal from an aircraft or drone to determine characteristics of any of the aircraft or drone's motion or meteorological conditions in which the aircraft is moving. The method includes the steps of providing a plurality of platforms for detecting Doppler shift information of the transmitted signal at each of the plurality of platforms, and determining characteristics of any of the aircraft or drone's motion or meteorological conditions in which the aircraft or drone is moving.

BRIEF DESCRIPTION OF THE DRAWINGS

The following description may be further understood with reference to the accompanying drawings in which.

Figure 1:
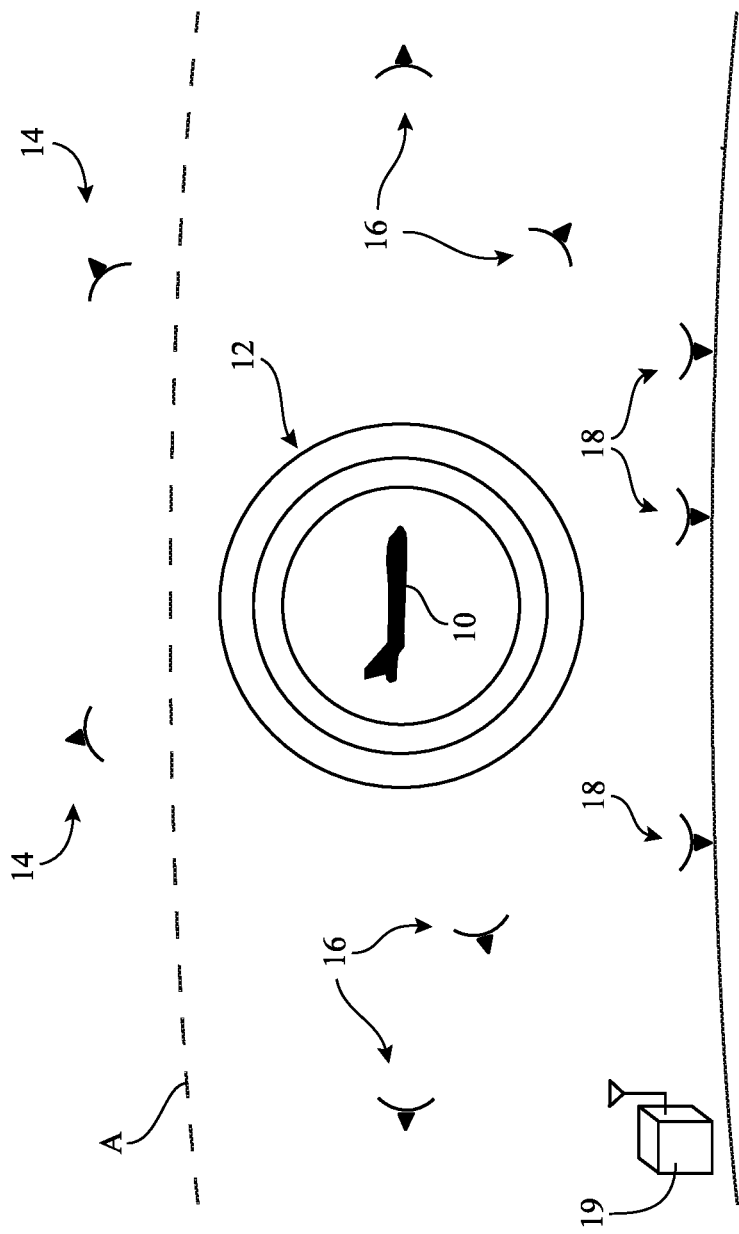
FIG. 1 shows an illustrative diagrammatic view of an ADS-B data collection system in accordance with an embodiment of the present invention.

The drawings are shown for illustrative purposes only.

DETAILED DESCRIPTION

The implementation of the ADS-B system may further provide opportunity for a wide range of applications of the ADS-B system beyond the scope and requirements of the ADS-B system. These new applications may bring the potential of substantial value-added. For example, certain of these value-added services may be enabled, or greatly enhanced, by extraction of the Doppler shift of the ADS-B out signal. Specifically, if the Doppler shift (frequency of arrival) of an aircraft or drone ADS-B transmission is measured accurately from multiple, geographically-distributed collection platforms, enables the reconstruction of the aircraft or drone three-dimensional (3D) position and velocity vector. This information, in accordance with certain embodiments and systems described herein, enables several services, including 1) aircraft or drone flight surveillance, independent of aircraft or drone navigation systems or GPS data, 2) meteorology data, and 3) independent information to verify the authenticity of the signal information, thus enhancing Cyber security. For general background see, Matthias Schafer, et. al., "Secure Motion Verification using the Doppler Effect," *Proceedings of the 9th ACM Conference on Security & Privacy in Wireless and Mobile Networks*, pp. 135-145, Darmstadt, Germany, Jul. 18-20, 2016; and N. Ghose, L. Lazos, "Verifying ADS-B Navigation Information Through Doppler Shift Measurements," *IEEE/AIAA 34th Digital Avionics Systems Conference (DASC)*, September 2015.

For aircraft and drone flight surveillance and meteorology sensor data, the state of the art has not identified the extraction and use of ADS-B Doppler data, much less data combined from multiple collection platforms. Further, while some researchers have identified ADS-B Doppler data for use in cyber security, they have only envisioned single or dual collection platforms; furthermore, they have not identified the requirement for highly-accurate Doppler data.

For non-relativistic problems such as this, the frequency of arrival at the collection platform (FOA) is:

$$FOA = \left(1 + \frac{\Delta v}{c}\right) f_0 \quad (1)$$

and the Doppler shift, $\Delta f$, is:

$$\Delta f \equiv FOA - f_0 = \frac{\Delta v}{c} f_0 \quad (2)$$

where c is the speed of light ($\sim 300 \times 10^6$ m/s), $\Delta v$ is the relative velocity, or range-rate, between receiver and source, $f_0$ is the emitted ADS-B frequency (approximately 1090 MHz) at the source, and $\Delta f$ is the FOA at the collection platform minus the source frequency, $f_0$. Rearranging, we have:

$$\Delta v = \frac{c \Delta f}{f_0} \quad (3)$$

A significant challenge in exploiting the ADS-B Doppler shift is transponder instability. That is, the aircraft or drone mounted transponders, that transmit the ADS-B signal, do not transmit at a stable frequency, $f_0$. Furthermore, ADS-B standards do not mandate a highly accurate baseline transmission frequency. Therefore, in addition to our innovations of (i) using ADS-B Doppler measurements, (ii) using it for new applications, and (iii) using a multi-collection platform architecture in order to compute the aircraft or drone 3D position and velocity vector, we also present innovations regarding (iv) eliminating or reducing significantly the impact of ADS-B transponder instability, therefore significantly improving the aircraft or drone 3D position and velocity estimates.

Systems of various embodiments of the invention provide a surveillance system that is independent of aircraft or drone navigation systems or GPS data. In certain embodiments, the system complements a GPS system as follows. First, the GPS method provides multiple external signal transmitters that are collected by the target vehicle. The target vehicle then processes the signals and computes the navigational fix, and must transmit the fix in order for it to be used by external entities. Second, systems of certain embodiments on the invention on the other hand, provide multiple external signal transmitters that receive a single signal transmitted by the target vehicle. The system of collectors then processes the received signals and computes the navigational fix, all external to the vehicle.

Compared to the GPS method therefore, methods of certain embodiments reverse the information flow, using a different navigational signal, and compute the navigational fix off-vehicle rather than on-vehicle, and is therefore complimentary to the GPS method. Further, methods of certain embodiments provide a backup to the GPS method in the sense that Applicant's method does not rely on GPS data. If the GPS system fails, Applicant's method would continue to function in the same way. This is also true if other aircraft or drone navigational systems, such as the inertial navigation system, failed or were corrupted by cyber-attack. In general, Applicant's method continues to function in the same way even if the ADS-B signal contained erroneous navigation data.

In accordance with various embodiments, systems of the invention use ADS-B Doppler information to compute accurately the 3D, aircraft or drone position and velocity vector. For a given aircraft or drone en route, multiple, spatially distributed, platforms are used to collect the Doppler shift of its ADS-B transmissions. These collection platforms may be any combination of ground-based, airborne, and spacecraft-based. FIG. 1 illustrates this collection system in which an aircraft 10 produces outgoing ADS-B signals 12 that may be received by any of spacecraft-based collection platforms 14 above one or more layers of atmosphere A, airborne collection platforms 16 and ground-based collection platforms 18. The processing of the data may be performed by one or more central processing stations 19.

By using multiple (at least four but typically more) collection platforms, systems of the invention are able to reconstruct the aircraft or drone position and velocity vector. Specifically, the Doppler shift extracted by a single collection platform, merely provides an estimate of the range rate between the aircraft or drone and the platform, as given by Equation (3). By combining multiple collections in an optimal estimation method, such as using extended Kalman filtering, particle filters, nonlinear batch least squares, etc., the best estimate of the aircraft or drone overall, 3D, position and velocity vector may be computed. The rationale for a minimum of four collection platforms is discussed below.

Figure 2:
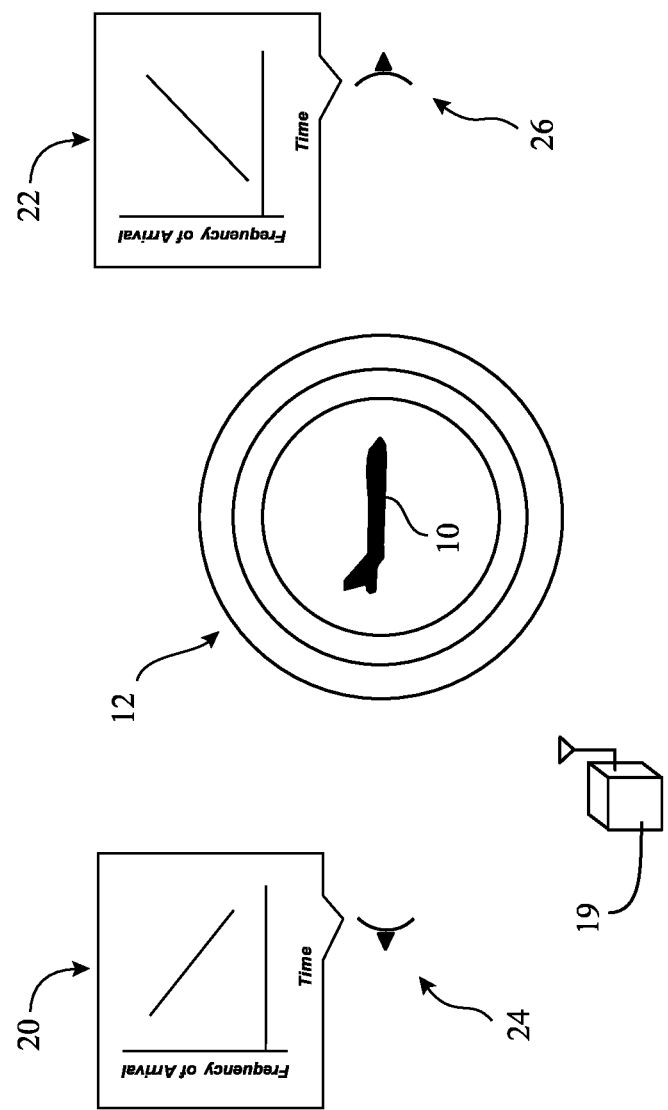
FIG. 2 shows an illustrative diagrammatic view of a notional ADS-B frequency of arrival (FOA) as collected by different platforms in accordance with an embodiment of the present invention.

FIG. 2 notionally illustrates how the FOA, given by Equation (1) and as collected by different platforms 24, 26, can differ. With reference to FIG. 2, the ADS-B signal collected by the left-side platform has a decreasing frequency with time as shown at 20, whereas the ADS-B signal collected by the right-side platform has an increasing frequency as shown at 22. Assuming a constant $f_0$, this would be caused by a decreasing and an increasing range rate, respectively, as Equation (1) indicates.

Due to geometric dilution of precision (GDOP) effects (e.g., if the satellite FOA observations are not orthogonal), the reconstructed aircraft or drone velocity covariance may have greater uncertainty in certain dimensions than it otherwise would if the observers were well spaced around the aircraft or drone. This GDOP effect can be resolved with proper geometric spacing of the collection platforms, or with a greater number of collection platforms, over and above the minimum required. In accordance with various embodiments, therefore, systems and methods of the invention provide that ADS-B FOA signals may be collected not merely from terrestrial platforms, but from airborne and spacecraft platforms as well, for the purpose of extracting Doppler shift information and computing the aircraft or drone 3D position and velocity vector.

As discussed above, a significant technical challenge with using ADS-B Doppler data is transponder frequency instability and the lack of a precise baseline transmission frequency, $f_0$. Transponder instability results in noise in the FOA measurement whereas a bias in $f_0$ (from 1090 MHz) results in a bias in the FOA measurement. In either case, variations in $f_0$ feeds directly into the FOA, which will result in range rate error, as per Equation (3).

Figure 3B:
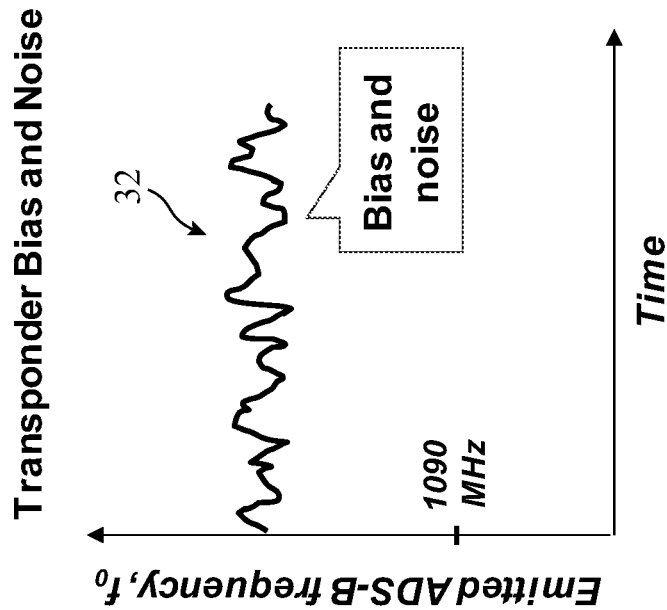
FIGS. 3A and 3B show illustrative graphical representations of notional examples of ADS-B transponder bias (FIG. 3A) and both ADS-B transponder bias and noise (FIG. 3B)
Figure 3A:
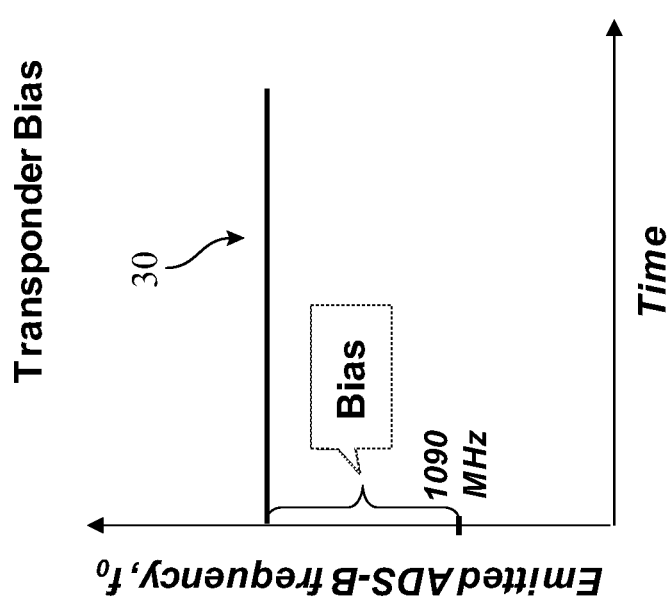

FIGS. 3A and 3B illustrate a signal that has transponder bias in $f_0$ (as shown at 30 in FIG. 3A), and a signal that has both transponder bias and noise in $f_0$ (shown at 32 in FIG. 3B). ADS-B transponders generally have both bias and noise in $f_0$, and these may vary significantly between transponders. In accordance with various embodiments, systems and methods of the invention seek to provide an accurate 3D position and velocity vector estimate, so the transponder bias and noise must be accommodated. One method to reduce significantly the sensitivity of the measurement to $f_0$, is to use the difference between FOA measurements, to produce the frequency difference of arrival (FDOA). From Equation (1):

$$FDOA = \frac{f_0}{c}(\Delta v_1 - \Delta v_2) \quad (4)$$

The FDOA measurement has greatly reduced sensitivity to $f_0$. Specifically, from Equation (1) it may be seen that the sensitivity of the FOA to $f_0$ is close to unity:

$$\frac{\partial FOA}{\partial f_0} = \left(1 + \frac{\Delta v}{c}\right) \quad (5)$$

On the other hand, from Equation (4), it may be seen that the sensitivity of FDOA to $f_0$ is, all else being equal, more than five orders of magnitude reduced:

$$\frac{\partial FDOA}{\partial f_0} = \frac{\Delta v_1 - \Delta v_2}{c} \quad (6)$$

The FDOA measurement provides an innovative solution for significantly reducing the impact of uncertainty in $f_0$ due to ADS-B transponder instability and baseline transmission frequency variations, in 3D aircraft or drone position and velocity vector applications. In accordance with various embodiments, the invention therefore provides systems and methods that use ADS-B Doppler FDOA for enhanced aircraft or drone position and velocity vector estimation accuracy.

One consequence of replacing FOA with FDOA is that we effectively lose one collection platform. That is, for n FOA collection platforms (which yield n independent FOA measurements), FDOA yields n–1 independent measurements. Therefore, instead of a minimum of three collection platforms required to estimate the 3D aircraft or drone position and velocity vector, a minimum of four collection platforms is needed, in order to use FDOA, rather than FOA, as the measured data. A second consequence is that, in order to compute FDOA, the collected FOA sampled data must be transmitted to a common computational facility, in order to compute the difference. These can be reasonable costs given the advantage of FDOA.

As the above showed, FDOA significantly reduces measurement errors due to the ADS-B transponder frequency bias and noise, compared to FOA. But the degree of FDOA's success in reducing the sensitivity to transponder noise depends on two factors: 1) the difference in aircraft or drone collection platform ranges, and 2) the speed (also referred to as frequency or spectral content) of the transponder noise.

For the difference in aircraft-collection platform ranges, and with reference again to FIG. 2, different collection platforms (e.g., 24, 26) may have significantly different ranges to the aircraft or drone. The result of such range differences is that the FDOA measurement is computed by subtracting transponder signals which were transmitted at different times. For example, a 6 km difference in the range from the aircraft or drone to one platform, compared to the range from the aircraft or drone to a second platform, results in a difference of about 20 μsec (i.e., twenty-one millionth of a second) difference in the transit time of the ADS-B signal to the two different collection platforms. Therefore, if the FDOA is computed by subtracting FOA signals that are received at the same time, then those two signals were not transmitted at the same time. In other words, the two signals are aligned by receive time, not by transmit time.

There are two implications of aligning signals by receive time, when computing FDOA. First, since the aircraft or drone state (position and velocity) is time-varying, this means that two signals correspond to two different aircraft or drone states. This greatly complicates the data model, though the impact of this error source is typically small since aircraft or drone dynamics are usually slower than the transmit time difference between the two signals.

Figure 4B:
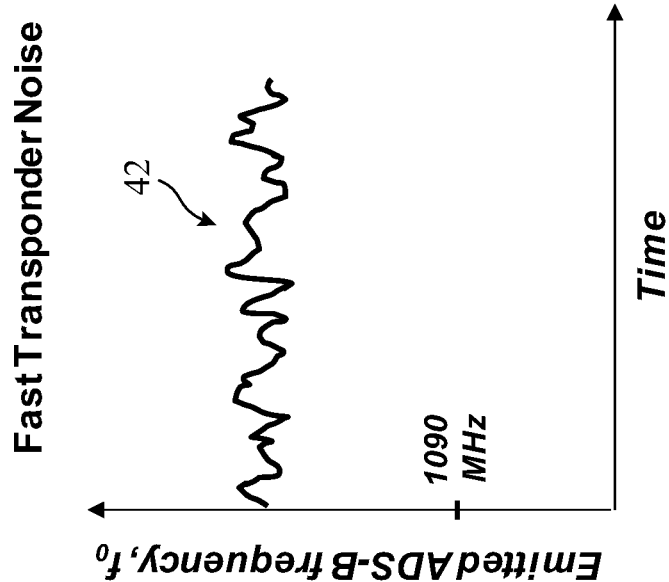
FIGS. 4A and 4B show illustrative graphical representations of ADS-B frequency signals with slow (low) frequency noise (FIG. 4A) and fast (high) frequency noise (FIG. 4B)
Figure 4A:
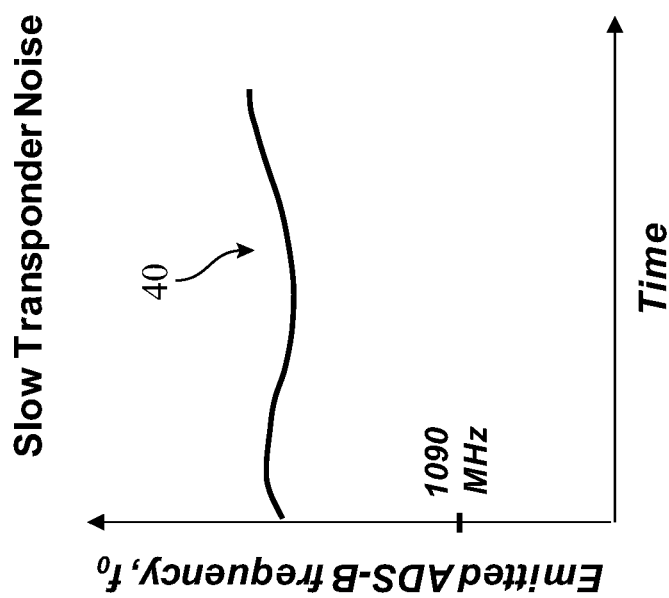

The second implication of aligning signals by receive time is that the derived FDOA is corrupted by the transponder $f_0$ frequency instability. FIGS. 4A and 4B show two $f_0$ examples with relatively slow and fast (or low and high frequency), noise content, respectively. The slow noise content is shown at 40 in FIG. 4A, and the fast noise content is shown at 42 in FIG. 4B.

Figure 5B:
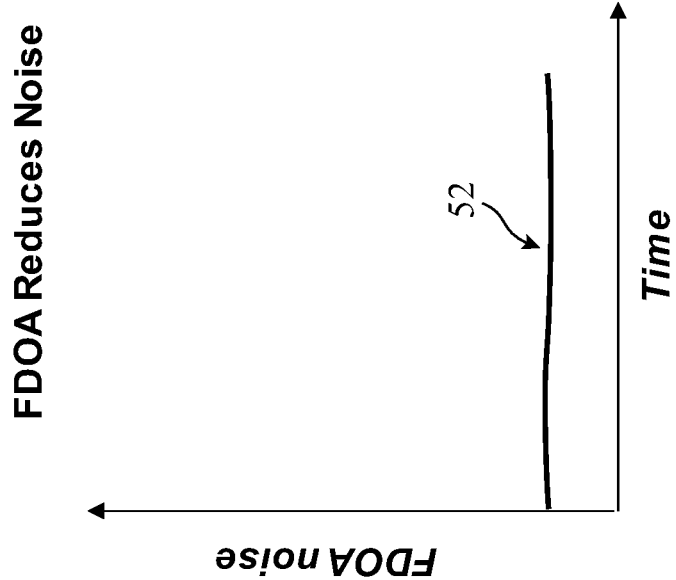
FIGS. 5A and 5B show illustrative graphical representations of notional illustrations of how frequency difference of arrival (FDOA) with transponder noise (FIG. 5A) and with transponder noise cancelled (FIG. 5B) when the time misalignment is small compared to noise frequency content.
Figure 5A:
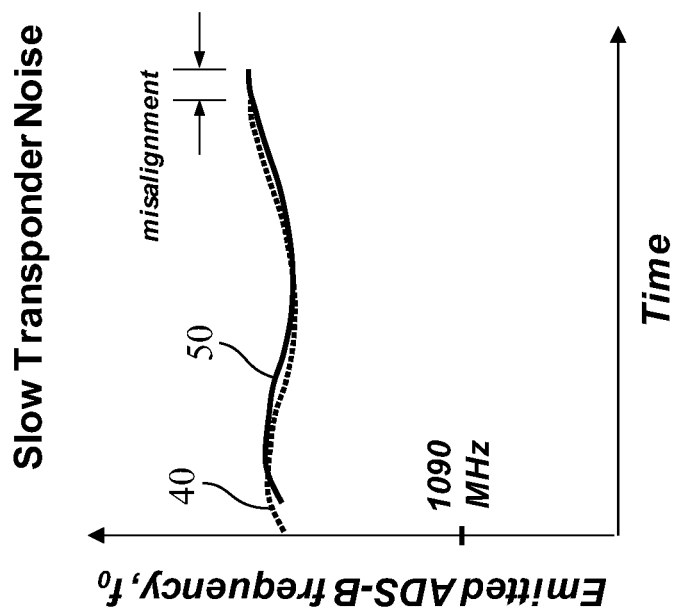

The FDOA measurement largely cancels out the transponder noise if the transponder noise is slow relative to the time misalignment. This is because the noise in the two FOA signals is highly correlated. This is illustrated notionally in FIGS. 5A and 5B, using the slow transponder noise example from FIGS. 4A and 4B. In particular, the slow transponder noise 40 is largely cancelled out by time misaligned signal 50 shown in FIG. 5A, resulting in a reduced noise signal 52 shown in FIG. 5B.

Figure 6A:
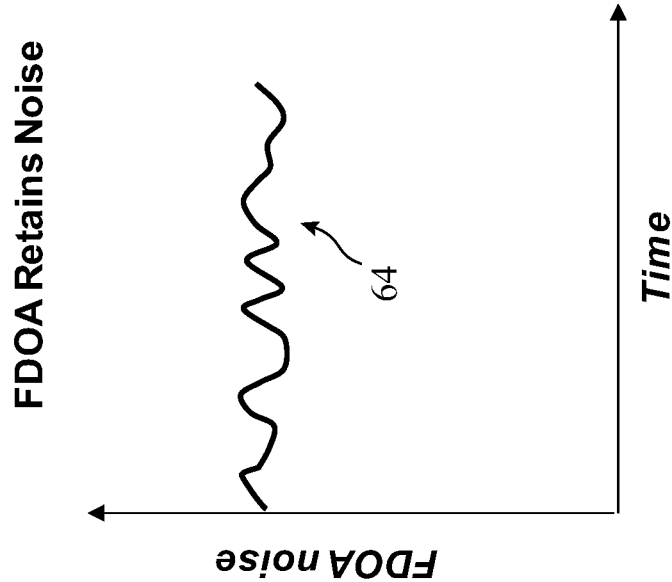
FIGS. 6A and 6B show illustrative graphical representations of notional illustrations of how frequency difference of arrival (FDOA) with transponder noise (FIG. 6A) and with transponder noise not cancelled (FIG. 6B) when the time misalignment is large compared to noise frequency content.
Figure 6B:
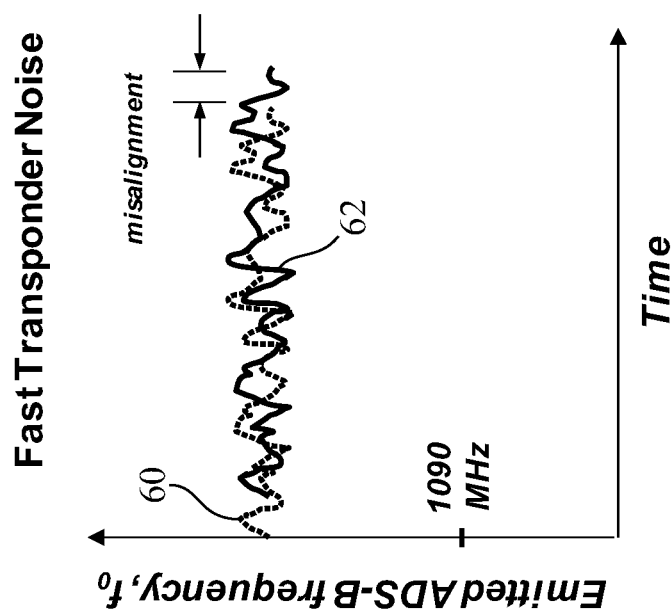

On the other hand, FIGS. 6A and 6B notionally illustrates the fast transponder case, where the transponder noise 60 is fast relative to the time misalignment 62 as shown in FIG. 6A. In this case, the noise in the two FOA signals is largely uncorrelated, and so therefore the noise does not cancel out when the two FOA signals are subtracted (as shown at 64 in FIG. 6B) to form FDOA.

In this example with a 20 μsec misalignment, if $f_0$ has high-frequency noise within this time span (as illustrated in FIG. 6A), such that random variations in $f_0$ occur faster than 20 μsec, then the FDOA calculation will not eliminate that noise. Test results have suggested that $f_0$ has such high-frequency noise (see Matthias Schafer, et. al., "Secure Motion Verification using the Doppler Effect," *Proceedings of the 9th ACM Conference on Security & Privacy in Wireless and Mobile Networks*, pp. 135-145, Darmstadt, Germany, Jul. 18-20, 2016 and Mauro Leonardi, Luca Di Gregorio and Davide Di Fausto, "Air Traffic Security: Aircraft Classification Using ADS-B Message's Phase Pattern", *Aerospace*, No. 4, v. 51, 2017). Since the collection platforms will often have range differences greater than 6 km (as illustrated in FIG. 1), the fast transponder noise case must be accommodated.

Therefore, the system seeks to reduce the impact of such high-frequency noise by estimating the transit time difference between i) the two different collection platforms (i.e., estimate the difference between the aircraft or drone-platform 1 and ii) aircraft or drone-platform 2 ranges and converting this difference in ranges to a difference in transit times). This estimate is feasible when the collection systems have accurate knowledge of the locations of their collection platforms, and will typically have reasonably accurate estimates of the current location of aircraft or drone they are tracking.

By estimating this difference in ranges, and therefore ADS-B signal transit times and misalignment, the FDOA calculation can be improved by introducing a time delay (equivalent to the misalignment) in the FOA signal arriving first. For example, if the aircraft or drone location is known to within 15 m, such that the maximum error in the range difference would be 30 m, then transponder noise down to 100 nsec (i.e., 100 nano seconds) would be cancelled.

In accordance with further embodiments of the present invention, the system may dynamically update the estimate of the difference in ranges between i) the aircraft or drone-platform 1 and ii) the aircraft or drone-platform 2. In other words, the process begins with an initial estimate of the difference in ranges. It converts differences in ranges to a difference in transit times. This difference in transit times is used to align the FOA signals, compute the corresponding FDOA, and use it to compute a more accurate estimate of the aircraft or drone position vector. This more accurate estimate of the aircraft or drone location provides a new, more accurate estimate of the difference in ranges between i) the aircraft or drone-platform 1 and ii) aircraft or drone-platform 2. This leads to a more accurate difference in transit times, which may then be used to align the FOA signals more accurately. This iterative process continues, and rapidly converges, removing the initial uncertainty in the aircraft or drone location.

In accordance with certain embodiments therefore, the invention provides systems and methods that use the current best estimate of aircraft or drone and collection platform positions to correct the FDOA calculation by reducing the time misalignment, thereby enhancing aircraft or drone velocity vector estimation accuracy. The method may perform this calculation iteratively. If an estimate of the aircraft or drone position is not available, the system may generate one by comparing the fields of view of each of the collector antennae. Specifically, if the aircraft or drone ADS-B out signal was detected by N collector antennae, the system may geometrically overlap the fields of view of all N antennae, at the instant of detection. The system may compute the overlap (or intersection) that is common to all the fields of view. Assuming a reasonable aircraft or drone altitude, such as 20,000 feet mean sea level, this constrains the aircraft or drone position to a curved surface. The system will then compute the intersection of the N fields of view along with the altitude curved surface. Finally, for the resulting geometric shape, the system will compute a centroid location to estimate the aircraft or drone position.

The process estimates the aircraft or drone position using the geometric fields of view of the antennae that simultaneously detect the aircraft or drone ADS-B out signal. The process computes the intersection of those fields of view and a reasonable altitude constraint. This intersection provides a curved geometric surface from which the system may compute a centroid location (which is a point on the surface) to estimate the aircraft or drone position at the time of its ADS-B out transmission.

Of course less accurate aircraft or drone locations would lead to less accurate time misalignment corrections. In this case, a further method is provided as discussed below.

In addition to the time misalignment correction factor described above, a further method is presented herein for correcting the misalignment. This method does not require the aircraft or drone position. It does, however, require a transmit time stamp. The ADS-B messages include transmit time stamps (indicating the time the message was transmitted by the aircraft or drone) that can be used to determine the transit time difference between collection platforms. The method here is to align the ADS-B messages detected by different collectors, according to the transmit time stamp, when that time stamp is available. This ensures that the extracted FOA data, used to drive the FDOA data, are aligned by transmit time, thereby cancelling out the transponder $f_0$ frequency noise.

In accordance with various embodiments therefore, the invention provides a process that uses the transmit time stamp encoded on ADS-B out messages to correct the time misalignment in the FDOA calculation, calculated from at least four FOA collections, thereby cancelling out the transponder $f_0$ frequency noise, and thereby enhancing the aircraft or drone 3D position and velocity vector estimation accuracy.

With the transponder $f_0$ frequency noise cancelled out, the FDOA measurement, and resulting range rate information, becomes extremely accurate. For example, given a 1 Hz FOA measurement accuracy, Equations (3) and (5) give a range rate difference accuracy of about 0.5 m/s. In accordance with various embodiments, therefore, the invention provides a system and method that uses the transmit time stamp encoded on ADS-B messages to correct the time misalignment in the FDOA calculation, thereby enhancing aircraft velocity vector estimation accuracy.

The ADS-B message transmit time stamp also allows the system to derive a time of arrival (TOA) measurement, subtracting the transmit time from the collector receive time. Whereas FOA provides range rate information, TOA provides range information. And as with the FOA measurements, multiple (4 or more) TOA measurements are collected from geographically distributed collectors. These are combined geometrically, in an optimal estimation method, to derive the aircraft or drone 3D position vector.

In accordance with various embodiments therefore, the process collects ADS-B TOA signals not merely from terrestrial platforms, but from airborne and spacecraft platforms as well, for the purpose of extracting range information and computing the aircraft or drone 3D position vector.

The collection platforms (terrestrial, airborne, and spacecraft) all have clocks. These clocks provide the receive time, used to compute the above TOA measurements. The clocks on all of the collection platforms are synchronized. The aircraft or drone clock is, however, not synchronized with the collection platform clocks. Therefore there is a difference, or bias, between i) the collection clocks, and ii) the aircraft or drone clock. The aircraft or drone clock time is unknown, and therefore this bias is unknown. Therefore, the TOA measurements contain a common, unknown, bias.

This common bias is conveniently removed by computing the time different of arrival (TDOA) measurements as the difference between the respective TOA measurements. As with the FDOA measurements, a consequence of replacing TOA with TDOA is that the system effectively loses one collection platform. That is, for n TOA collection platforms (which yield n independent TOA measurements), TDOA yields n−1 independent measurements. Therefore, instead of a minimum of three collection platforms required to estimate the 3D aircraft or drone position vector, a minimum of four collection platforms are needed, in order to use TDOA, rather than TOA, as the measured data.

The method here involves comparing the receive times at the two respective collection platforms, of a given ADS-B message. The message received at two different collection platforms derives from a single aircraft or drone transponder transmission event; this is because the received messages have identical aircraft or drone identification code and transmit time stamp. The signal receive time is determined by the collection platform clock. The receive times of an ADS-B message that has common transmit time stamp and common aircraft or drone identification code, are subtracted from one another, and the difference in the receive times is the TDOA measurement.

The method therefore, uses ADS-B TDOA for enhanced aircraft or drone position vector estimation accuracy. FDOA and TDOA make for a powerful combination when estimating the aircraft or drone state (position and velocity).

A remaining error in the TDOA measurement is the clock differences between different collection platforms. In other words, any errors in the synchronizations of the collection platform clocks. Any synchronization error between the collection platform clocks will directly translate into error in TDOA measurement error. For the Iridium satellite constellation, for example, this synchronization error has been shown to be on the order of 100-200 nsec (see John Dolan, Michael Garcia, "Aireon Independent Validation of Aircraft Position Via Space-Based ADS-B," 2018 *Enhanced Solutions for Aircraft and Vehicle Surveillance (ESA VS) Applications Conference*, Oct. 17-19, 2018.). This translates into a 30 m to 60 m range error in the TDOA measurement.

A common problem in surveillance systems is data dropout. This refers to time periods when tracking data are not available, for a given aircraft or drone, for a number of possible reasons. Because our method provides a hyper accurate velocity vector, the aircraft or drone can sustain data dropouts for longer periods of time, and still maintain required accuracy.

Figure 7A:
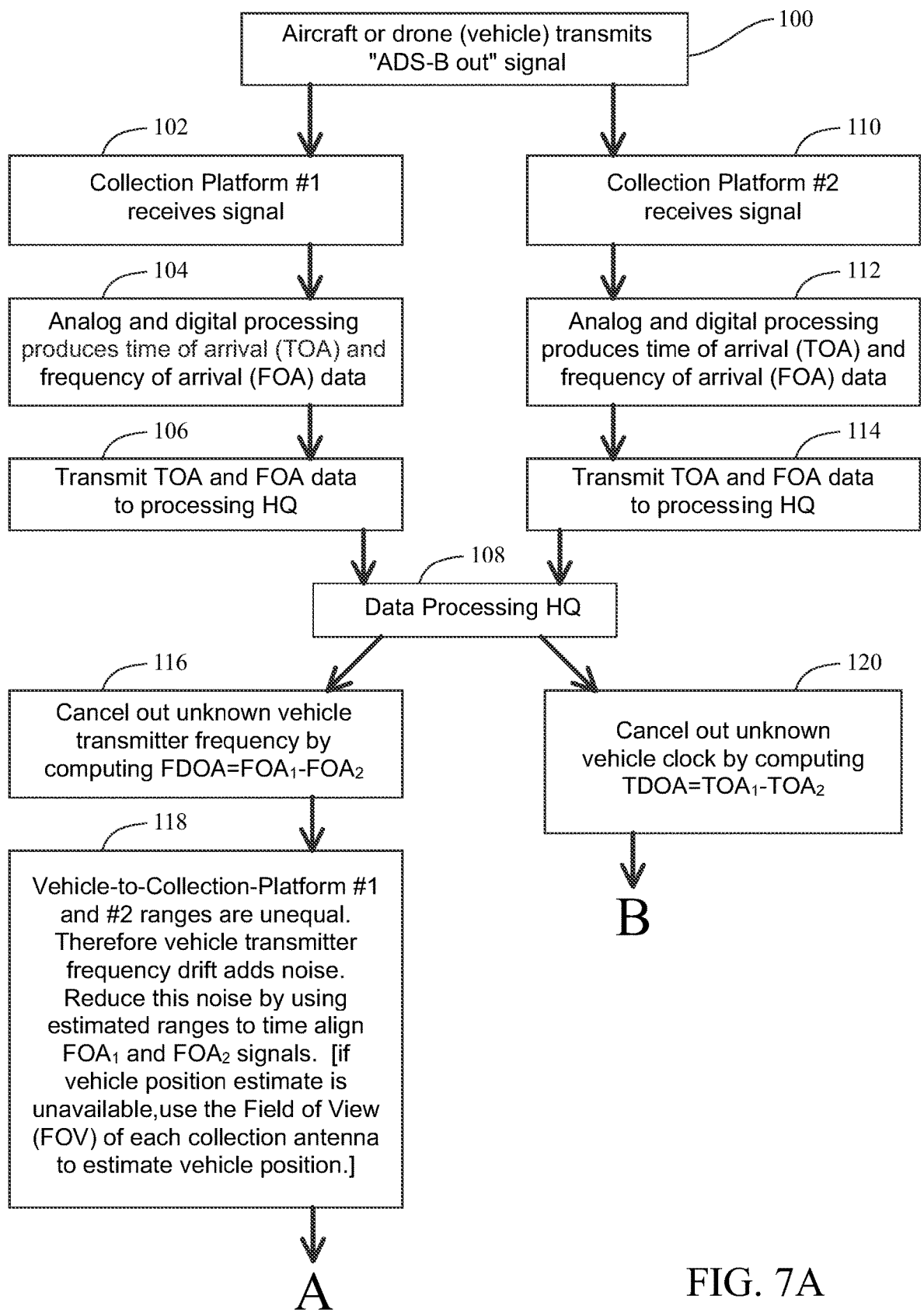
FIGS. 7A and 7B show illustrative diagrammatic flow chart representations of ADS-B processing in a system in accordance with an embodiment of the present invention.
Figure 7B:
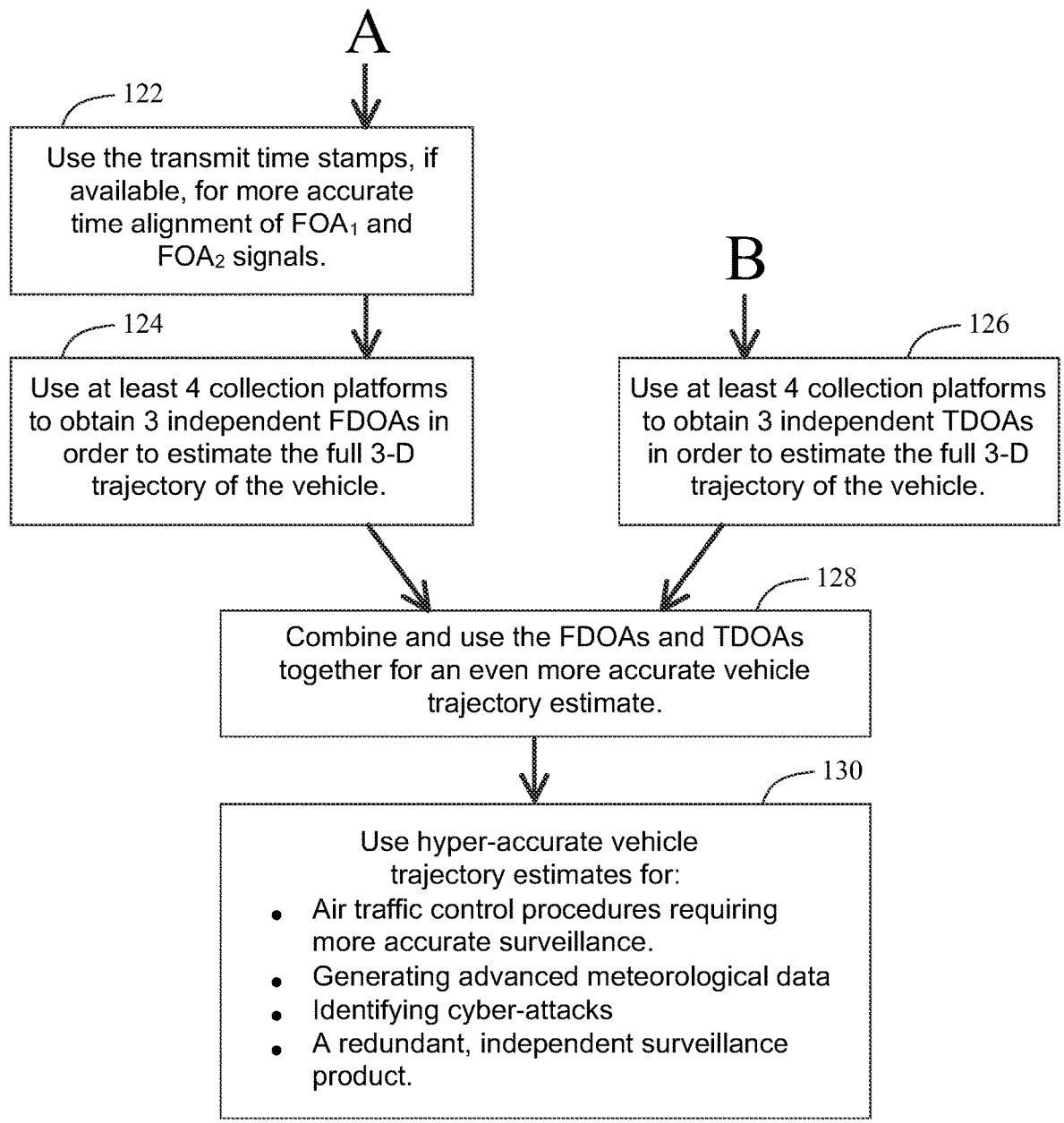

FIGS. 7A and 7B show an ADS-B processing flow chart in accordance with an embodiment of the invention. The process begins (step 100) with the aircraft or drone (vehicle) transmitting and ADS-B out signal. The ADS-B out signal is broadcast to a plurality of collection platforms. For illustrative purposes, a collection platform #1 receives the signal (step 102), and an analog and digital processing system (e.g., within collection platforms 14, 16, 18) produce time of arrival (TOA) data and frequency of arrival (FOA) data (step 104). The system then transmits (step 106) the TOA data and the FOA data to a processing headquarters (e.g., in one or more processing systems 19). Control is then shifted to the data processing headquarters (step 108). At the same time, a collection platform #2 receives the signal (step 110), and an analog and digital processing system (e.g., within collection platforms 14, 16, 18) produce time of arrival (TOA) data and frequency of arrival (FOA) data (step 112). The system then transmits (step 114) the TOA data and the FOA data to a processing headquarters (e.g., in one or more processing systems 19). Again, control is shifted to the data processing headquarters (step 108).

The system then performs FDOA and TDOA routines as follows. The system cancels out an unknown vehicle transmitter frequency by computing $FDOA=FOA_1-FOA_2$ (step 116). Where the vehicle-to-collection Platform #1 and Platform #2 ranges are unequal, vehicle transmitter frequency adds noise. This noise is then reduced (step 118) by using estimated ranges to time align the $FOA_1$ and $FOA_2$ signals, and the equation of step 116 is re-computed. Note, if a vehicle position estimate is unavailable, the system may use the Field of View (FOV) of each collection antenna to estimate vehicle position. In parallel with this, the system cancels out an unknown vehicle clock by computing $TDOA=TOA_1-TOA_2$ (step 120).

Continuing with the FDOA routine, the system uses the transmit time stamps (if available) for more accurate time alignment of FOA1 and FOA2 signals (step 122), and the equation $FDOA=FOA_1-FOA_2$ is re-computed. The system then uses at least four collection platforms to obtain three independent FDOAs in order to estimate the 3D trajectory of the vehicle (step 124). Continuing with the TDOA routine, the system also uses at least four collection platforms to obtain three independent TDOAs in order to estimate the 3D trajectory of the vehicle (step 126).

The system then combines and uses the FDOAs and the TDOAs together for a further accurate vehicle trajectory estimate (step 128). The result is that the system provides (step 130) hyper-accurate trajectory estimates: 1) for air traffic control procedures requiring more accurate surveillance, 2) for generating advanced meteorological data, 3) for identifying cyber-attacks, and 4) for providing a redundant, independent surveillance product.

In accordance with various embodiments therefore, the invention provides systems and methods that provide a hyper accurate velocity vector that support a more accurate aircraft or drone state estimate during periods of surveillance data dropout.

The methods also produce invaluable, real-time, meteorological measurements, as the aircraft is used as a crowd-sourcing sensor of the atmosphere. For instance, the aircraft velocity vector has been shown to assist with the detection and prediction of turbulence (see J. Krozel, R. Sharman, "Remote Detection of Turbulence via ADS-B," *AIAA Guidance, Navigation, and Control Conference*, AIAA 2015-1547, AIAA SciTech, 2015, and Kamil Kwiatkowski, et. al., "Retrieving Atmospheric Turbulence Information From Regular Commercial Aircraft Using Mode-S and ADS-B," *Atmospheric Measurement Techniques*, May 2016). Unfortunately, the ADS-B message velocity data, particularly in the vertical dimension (aircraft vertical rate), is quite coarse. The vertical rate data are typically quantized to 64 FPS. By contrast, the applicant's methods are expected to improve upon this accuracy at least by an order of magnitude. Therefore, the applicant's methods support a much more powerful method for sensing turbulence. In accordance with various embodiments therefore, the invention provides systems and methods that produce hyper accurate aircraft or drone state estimates, which may be use to generate advanced meteorological data.

Finally, the methods provide support for detecting and defeating cyber security corruption of ADS-B information, such as the spoofing of aircraft or drone trajectories. By providing independent measurements to determine, with significantly higher accuracy, the aircraft or drone trajectory, the data serve as a verification that the transmitted ADS-B data have not been corrupted. The methods will assist and augment existing methods that are based on lower accuracy, single or dual platform, Doppler collections. In accordance with various embodiments therefore, the invention provides systems and methods that use the ADS-B Doppler information for identifying breaches and providing accurate information in the presence of cyber security attacks.

Those skilled in the art will appreciate that numerous modifications and variations may be made to the above disclosed embodiments without departing from the spirit and scope of the present invention.

What is claimed is:

1. A method for exploiting a transmitted signal from an aerial vehicle, said method comprising the steps of:

receiving N frequency of arrival (FOA) signals from N collectors that detect transmission signals from an aerial vehicle during flight, the N collectors being geographically dispersed at different ranges above and below the aerial vehicle, and N being equal to at least four;

measuring N-1 frequency difference of arrival (FDOA) signals based on the N FOA signals provided by N-1 collector pairs to reduce an unknown frequency bias and noise associated with the transmission signals from the aerial vehicle; and estimating a three-dimensional (3D) trajectory of the aerial vehicle based on the measured N-1 FDOA signals, wherein each of the FDOA signals is measured by:

estimating a transit time difference from the aerial vehicle to each of a first collector and a second collector in a collector pair based on known positions of the first collector and the second collector and an estimated position of the aerial vehicle;

time aligning the FOA signals received from the first collector and the second collector by delaying a first received one of the FOA signals by the transit time difference; and determining the FDOA signal for the collector pair by subtracting the time aligned FOA signals from each other; and wherein each of the foregoing steps are performed in real time during flight of the aerial vehicle.

2. The method as recited in claim 1, wherein the transmission signals from the aerial vehicle include automated dependent surveillance broadcast (ADS-B) signals.

3. The method as recited in claim 1, wherein the N collectors that are geographically dispersed at different ranges from the aerial vehicle include one or more spacecraft-based collectors above the aerial vehicle and one or more ground-based collectors below the aerial vehicle.

4. The method as recited in claim 3, wherein the N collectors that are geographically dispersed at different ranges from the aerial vehicle further include one or more airborne collectors.

5. The method as recited in claim 1, wherein estimating the 3D trajectory of the aerial vehicle based on the measured N-1 FDOA signals includes estimating a 3D position and velocity vector of the aerial vehicle.

6. The method as recited in claim 1, further comprising determining the estimated position of the aerial vehicle at an intersection of a plurality of geometric field of views associated with antennae of the N collectors.

7. The method as recited in claim 6, wherein the intersection provides a curved geometric surface from which a centroid location is selected as the estimated.

8. The method as recited in claim 1, wherein the first collector in the collector pair is a spacecraft-based collector above the aerial vehicle and the second collector in the collector pair is a ground-based collector below the aerial vehicle.

\* \* \* \* \*